(12) United States Patent
Snuggerud et al.

(10) Patent No.: US 10,466,367 B1
(45) Date of Patent: Nov. 5, 2019

(54) NEUTRON PATH ENHANCEMENT

(71) Applicant: NuScale Power, LLC, Corvallis, OR (US)

(72) Inventors: Ross Snuggerud, Corvallis, OR (US); Russell Goff, Corvallis, OR (US)

(73) Assignee: NUSCALE POWER, LLC, Portland, OR (US)

( * ) Notice: Subject to any disclaimer, the term of this patent is extended or adjusted under 35 U.S.C. 154(b) by 1907 days.

(21) Appl. No.: 14/242,677

(22) Filed: Apr. 1, 2014

Related U.S. Application Data

(60) Provisional application No. 61/921,037, filed on Dec. 26, 2013.

(51) Int. Cl.
*G01N 23/05* (2006.01)
*G01T 1/16* (2006.01)
*G01T 3/00* (2006.01)

(52) U.S. Cl.
CPC . *G01T 1/16* (2013.01); *G01T 3/00* (2013.01)

(58) Field of Classification Search
CPC ..................................................... G01N 23/05
See application file for complete search history.

(56) References Cited

U.S. PATENT DOCUMENTS

| | | | | |
|---|---|---|---|---|
| 4,092,542 A * | 5/1978 | De Volpi | ............... | G01N 23/05 250/358.1 |
| 4,208,247 A | 6/1980 | Impink, Jr. | | |
| 4,764,335 A * | 8/1988 | Gross | ................... | G21C 17/044 376/253 |
| 5,108,694 A | 4/1992 | Stucker | | |
| 8,116,421 B2 | 2/2012 | Kitazono | | |
| 8,442,181 B2 | 5/2013 | Kitazono | | |
| 8,588,360 B2 | 11/2013 | Reyes, Jr. et al. | | |
| 8,687,759 B2 | 4/2014 | Reyes, Jr. et al. | | |
| 2009/0129531 A1 | 5/2009 | Reyes, Jr. et al. | | |
| 2012/0087454 A1 | 4/2012 | Stucker | | |
| 2012/0195402 A1 | 8/2012 | Chahande et al. | | |
| 2013/0034198 A1* | 2/2013 | Chandrasekharan | ....................... | G01V 5/0091 376/159 |

(Continued)

FOREIGN PATENT DOCUMENTS

| | | | |
|---|---|---|---|
| JP | 48031400 A | 4/1973 | |
| JP | 50133397 A | 10/1975 | |

(Continued)

*Primary Examiner* — Hugh Maupin
(74) *Attorney, Agent, or Firm* — Schwabe Williamson & Wyatt, LLP

(57) ABSTRACT

A neutron detection system may include a neutron detection device located outside of a reactor vessel. The neutron detection device may be configured to detect neutrons generated within the reactor vessel. A containment region located intermediate the reactor vessel and a containment vessel may be configured to house a containment medium. A neutron path device may be at least partially located between the reactor vessel and the containment vessel, and the neutron path device may be configured to provide a neutron path to the neutron detection device through a neutron path medium contained within the neutron path device. A neutron attenuation coefficient associated with the neutron path medium may be smaller than a neutron attenuation coefficient associated with the containment medium.

20 Claims, 5 Drawing Sheets

(56) References Cited

U.S. PATENT DOCUMENTS

2015/0060686 A1\* 3/2015 DeVolpi .................... G01T 3/00
                                                        250/390.1

FOREIGN PATENT DOCUMENTS

| JP | 56079289 A   | 6/1981  |
|----|--------------|---------|
| JP | 64-88298 A   | 4/1989  |
| JP | 06194482 A   | 7/1994  |
| JP | 08129089 A   | 5/1996  |
| JP | 54033994 A   | 3/1997  |
| JP | 1010262 A    | 1/1998  |
| JP | 10-82884 A   | 3/1998  |
| JP | 11142576 A   | 5/1999  |
| JP | 3041058 B2   | 5/2000  |
| JP | 2006258729 A | 9/2006  |
| JP | 2008175732 A | 7/2008  |
| JP | 04248497 A   | 4/2009  |
| JP | 2009204581 A | 9/2009  |
| JP | 2011053092 A | 3/2011  |
| JP | 2012052889 A | 3/2012  |
| JP | 2012154662 A | 8/2012  |
| JP | 2013543590 A | 12/2013 |
| JP | 06265677 A   | 1/2018  |
| WO | 2012047568 A1 | 4/2012 |
| WO | 2015/099855 A2 | 7/2015 |

\* cited by examiner

NEUTRON PATH ENHANCEMENT

STATEMENT OF RELATED MATTER

This application claims priority to U.S. Provisional Application No. 61/921,037, filed on Dec. 26, 2013, which is incorporated by reference in its entirety.

TECHNICAL FIELD

This application relates to the field of power generation, including reactor systems that operate using a neutron source and/or a neutron detector.

BACKGROUND

Fission type nuclear reactors may be configured to use a neutron moderator to slow down, or moderate, neutrons produced by nuclear fission in order to increase the cross-section of the fuel source. The increased cross-section may in turn increase the number of neutrons that are available to cause fission events, rather than being captured by the fuel source, and thus propagate an ensuing chain reaction of fission events.

A thermal neutron is a free neutron which may have a kinetic energy of about 0.025 eV and/or a speed of 2.2 km/s after having a number of collisions with nuclei in a moderator, for example, at a temperature of approximately 17 degrees Celsius. Thermal neutrons typically have much larger interaction cross-sections than fast neutrons, and therefore may be more readily absorbed.

A combination of different types of neutron moderators, moderator temperatures, fuel cross-sections, and/or fuel temperatures may affect the rates of fission that are achievable during reactor startup and/or during operation of the reactor. For example, an increase in fuel temperature may raise the rate of epi-thermal neutron absorption of the fuel and provide a negative feedback that may be used to control the power level of the reactor. Additionally, a change in moderator temperature may also be used to provide negative feedback.

A device configured to emit neutrons, such as a neutron source, may be designed with a number of different parameters in mind. For example, the neutron source design parameters may include an amount of energy of the emitted neutrons, an emission rate of the neutrons, and/or other parameters depending on the particular application of the neutron source and/or of the reactor.

Spontaneous fission events produced by the fuel may be too weak for certain types of reactor monitoring instrumentation to detect. Starting a reactor without knowing the level of fission events and/or the level of neutron flux at or near the reactor core may be referred to as a "blind" start, which may not be permissible under various regulatory and/or operational requirements.

Neutron capture resulting from the thermal neutron flux in an operating reactor may change the composition of the isotopes, and reduce the useful life of the neutron source. Accordingly, the neutron source may be changed or replaced at regular intervals to ensure that there remain a sufficient number of neutrons being emitted during startup and/or during operation. While some types of neutron sources which are considered inert may be less expensive than neutron sources which are active, the initial absence of a sufficient neutron flux from the inert neutron source may result in a blind start. Additionally, some types of neutron detectors located at or near the reactor core may be configured to detect high levels of neutrons during reactor operation, and may not be sufficiently sensitive to detect relatively low levels of neutrons and/or to accurately measure reactivity, e.g., at reactor shutdown or at reactor shutdown.

A neutron source which does not have and/or which loses the capability to generate a sufficient number of neutrons in one or more modes of reactor operation may result in the reactor monitoring instrumentation being unable to detect or confirm the presence of the neutron source and/or to verity the associated neutron activity. Additionally, in some examples the inability to detect the level of neutron activity could also affect the ability to monitor an unexpected increase in reactivity during core shutdown, inspection, maintenance, and/or refueling.

The present application addresses these and other problems.

SUMMARY

Figure 1:
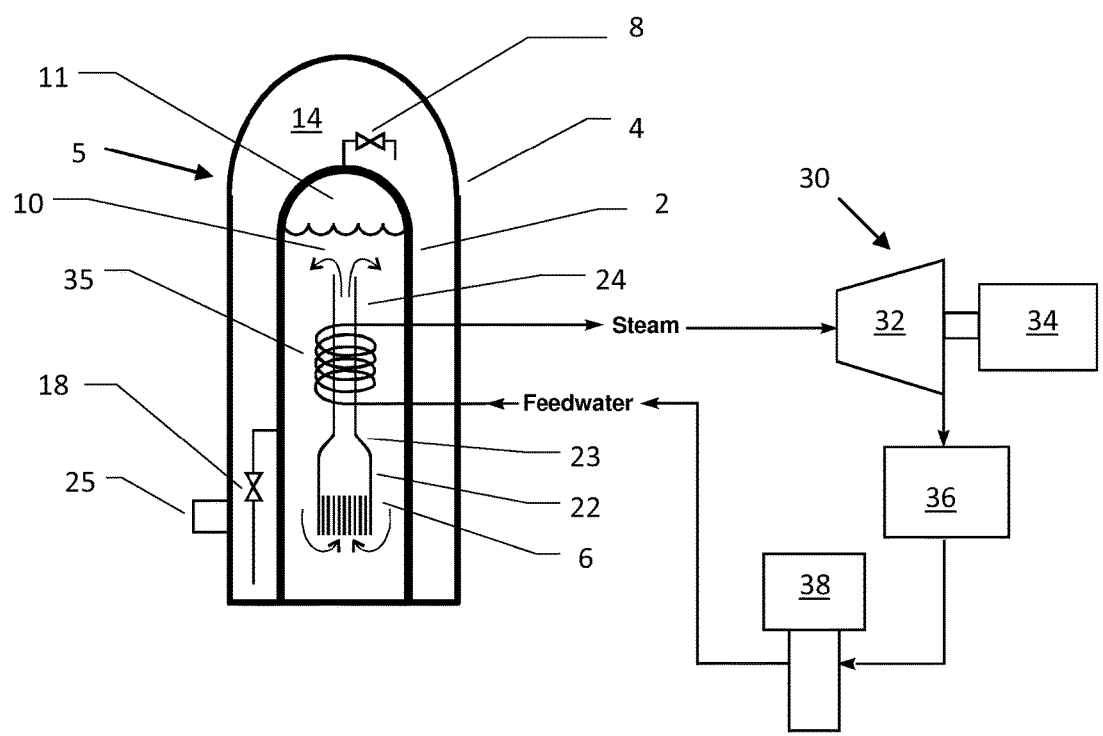
FIG. 1 illustrates an example nuclear reactor module.

An example neutron detection system disclosed herein may include a neutron detection device located outside of a containment vessel. In some examples, the neutron detection device may be located outside of a reactor vessel and inside of the surrounding containment vessel. The neutron detection device may be configured to detect neutrons generated by fissions that result from a neutron source and/or by fissions that occur in a reactor core located within a reactor vessel. Additionally, a containment region located intermediate the reactor vessel and the containment vessel may be configured to house a containment medium. A neutron path device may be at least partially located between the reactor vessel and the containment vessel, and the neutron path device may be configured to provide a neutron path to the neutron detection device. A neutron path medium may be contained within the neutron path device.

A neutron attenuation coefficient associated with the neutron path medium may be smaller than a neutron attenuation coefficient associated with the containment medium and/or with one or more other mediums or structures (including the reactor vessel and/or the containment vessel) which may be located between the neutron source/reactor core and the neutron detection device. Accordingly, neutrons that might otherwise be overly attenuated by the containment medium, mediums, and/or structures may be able to reach and/or be measured by the neutron detection device.

An example neutron path device disclosed herein may include a container configured to prohibit entry of a surrounding medium into the container. Additionally, the container may be configured to provide a neutron path to a neutron detector. A neutron path medium housed in the container may be maintained at a partial vacuum. A neutron attenuation coefficient associated with the neutron path medium maintained at the partial vacuum may be less than a neutron attenuation coefficient associated with the surrounding medium.

An example apparatus disclosed herein may include means for transmitting neutrons through a neutron path. The neutron path may include a neutron path medium. The apparatus may further include means for detecting a number of the neutrons transmitted through the neutron path. The means for detecting may be located outside of a reactor vessel, and a containment region located intermediate the reactor vessel and the surrounding containment vessel may be configured to house a containment medium. A neutron attenuation coefficient associated with the containment medium may be larger than a neutron attenuation coefficient associated with the neutron path medium.

An example process of detecting neutrons is disclosed herein. Neutrons may travel along a neutron path located, at least partially, within a neutron path device. The neutron path device may be configured to provide the neutron path to a neutron detector. The neutron path device may comprise and/or contain a first medium. A number of the neutrons generated, emanated, and/or transmitted through the neutron path may be detected by the neutron detector. The number of neutrons may be compared with a threshold value. The neutron detector and/or a processing device may be configured to infer a power level, reactivity, and/or multiplication factor ($K_{eff}$) of the reactor based, at least in part, on the number of neutrons. The inferred power level, reactivity, and/or multiplication factor may be used to determine whether to initiate a reactor startup.

An understanding of the above examples will become more readily apparent from the following detailed description with reference to the accompanying drawings.

DETAILED DESCRIPTION

Various examples disclosed and/or referred to herein may be operated consistent with, or in conjunction with, one or more features found in U.S. application Ser. No. 11/941,024 and/or U.S. application Ser. No. 12/397,481, which are herein incorporated by reference in their entirety.

FIG. 1 illustrates an example nuclear reactor module 5 comprising a reactor core 6 surrounded by a reactor vessel 2. Coolant 10 in the reactor vessel 2 surrounds the reactor core 6. The reactor core 6 may be located in a shroud 22 which surrounds reactor core 6 about its sides. When coolant 10 is heated by reactor core 6 as a result of fission events, coolant 10 may be directed from shroud 22 up into an annulus 23 located above reactor core 6, and out of a riser 24. This may result in additional coolant 10 being drawn into shroud 22 to be heated in turn by reactor core 6, which draws yet more coolant 10 into the shroud 22. The coolant 10 that emerges from riser 24 may be cooled down and directed towards the outside of the reactor vessel 2 and then return to the bottom of the reactor vessel 2 through natural circulation. Pressurized vapor 11 (e.g., steam) may be produced in the reactor vessel 2 as coolant 10 is heated.

A heat exchanger 35 may be configured to circulate feedwater and/or steam in a secondary cooling system 30 in order to generate electricity with a turbine 32 and a generator 34. In some examples, the feedwater passes through the heat exchanger 35 and may become super heated steam. The secondary cooling system 30 may include a condenser 36 and a feedwater pump 38. In some examples, the feedwater and/or steam in the secondary cooling system 30 are kept isolated from the coolant 10 in the reactor vessel 2, such that they are not allowed to mix or come into direct contact with each other.

Reactor vessel 2 may be surrounded by a containment vessel 4. In some examples, containment vessel 4 may be placed in a pool of water, for example as located below ground level. Containment vessel 4 may be configured to prohibit the release of coolant 10 associated with reactor vessel 2 to escape outside of containment vessel 4 and/or into the surrounding environment. In an emergency situation, vapor 11 may be vented from the reactor vessel 2 through a flow limiter 8 into containment vessel 4, and/or coolant 10 may be released through a blowdown valve 18. The rate of release of vapor 11 and/or coolant 10 into containment vessel 4 may vary according to the pressure within reactor vessel 2. In some examples, a decay heat associated with reactor core 6 may be removed, at least in part, through a combination of condensation of vapor 11 on the inner walls of containment vessel 4 and/or by the suppression of coolant 10 released through blowdown valve 18.

Containment vessel 4 may be approximately cylindrical in shape. In some examples, containment vessel 4 may have one or more ellipsoidal, domed, or spherical ends. Containment vessel 4 may be welded or otherwise sealed to the environment, such that liquids and/or gases are not allowed to escape from, or enter into, containment vessel 4. In various examples, reactor vessel 2 and/or containment vessel 4 may be bottom supported, top supported, supported about its center, or any combination thereof.

An inner surface of reactor vessel 2 may be exposed to a wet environment comprising coolant 10 and/or vapor 11, and an outer surface of reactor vessel 2 may be exposed to a substantially dry environment. The reactor vessel 2 may comprise and/or be made of stainless steel, carbon steel, other types of materials or composites, or any combination thereof. Additionally, reactor vessel 2 may include cladding and/or insulation.

Containment vessel 4 may substantially surround the reactor vessel 2 within a containment region 14. Containment region 14 may comprise a dry, voided, and/or gaseous environment in some examples and/or modes of operation. Containment region 14 may comprise an amount of air, a nobel gas such as Argonne, other types of gases, or any combination thereof. In some examples, containment region 14 may be maintained at or below atmospheric pressure, for example at a partial vacuum. In other examples, containment region 14 may be maintained at a substantially complete vacuum. Any gas or gasses in containment vessel 2 may be evacuated and/or removed prior to operation of reactor module 5.

Certain gases may be considered non-condensable under operating pressures that are experienced within a nuclear reactor system. These non-condensable gases may include hydrogen and oxygen, for example. During an emergency operation, steam may chemically react with the fuel rods to produce a high level of hydrogen. When hydrogen mixes with air or oxygen, this may create a combustible mixture. By removing a substantial portion of the air or oxygen from containment vessel 4, the amount of hydrogen and oxygen that is allowed to mix may be minimized or eliminated.

Any air or other gases that reside in containment region 14 may be removed or voided when an emergency condition is detected. The gases that are voided or evacuated from the containment region 14 may comprise non-condensable gases and/or condensable gases. Condensable gases may include any steam that is vented into containment region 14.

During an emergency operation, whereas vapor and/or steam may be vented into containment region 14, only a negligible amount of non-condensable gas (such as hydrogen) may be vented or released into containment region 14. It may be possible to assume from a practical standpoint, that substantially no non-condensable gases are released into containment region 14 together with the vapor. Accordingly, in some examples, substantially no hydrogen gas is vented into the containment region 14 together with the vapor, such that the levels and/or amounts of hydrogen together with any oxygen that may exist within the containment region 14 are maintained at a non-combustible level. Additionally, this non-combustible level of oxygen-hydrogen mixture may be maintained without the use of hydrogen recombiners.

Removal of convective heat transfer in air occurs generally at about 50 torr (50 mmHG) of absolute pressure, however a reduction in convective heat transfer may be observed at approximately 300 torr (300 mmHG) of absolute pressure. In some examples, containment region 14 may be provided with, or maintained below, a pressure of 300 torr (300 mmHG). In other examples, containment region 14 may be provided with, or maintained below, a pressure of 50 torr (50 mmHG). In some examples, containment region 14 may be provided with and/or maintained at a pressure level which substantially inhibits all convective and/or conductive heat transfer between reactor vessel 2 and containment vessel 4. A complete or partial vacuum may be provided and/or maintained by operating a vacuum pump, steam-air jet ejector, other types of evacuation devices, or any combination thereof.

By maintaining containment region 14 in a vacuum or partial vacuum, moisture within containment region 14 may be eliminated, thereby protecting electrical and mechanical components from corrosion or failure. Additionally, the vacuum or partial vacuum may operate to draw or pull coolant into the containment region 14 during an emergency operation (e.g. over-pressurization or over-heating event) without the use of a separate pump or elevated holding tank. The vacuum or partial vacuum may also operate to provide a way to flood or fill containment region 14 with coolant 10 during a refueling process.

Flow limiter 8 may be mounted on reactor vessel 2 for venting the coolant 10 and/or vapor 11 into containment vessel 4 during an emergency operation. Flow limiter 8 may be connected or mounted directly to an outer wall of reactor vessel 2, without any intervening structures such as piping or connections. In some examples, flow limiter 8 may be welded directly to reactor vessel 2 to minimize the likelihood of any leaking or structural failures. Flow limiter 8 may comprise a Venturi flow valve configured to release vapor 11 into the containment vessel 4 at a controlled rate. The condensation of vapor 11 may reduce pressure in containment vessel 4 at approximately the same rate that the vented vapor 11 adds pressure to containment vessel 4.

Coolant 10 that is released as vapor 11 into containment vessel 4 may condense on an inner surface of containment vessel 4 as a liquid, such as water. The condensation of the vapor 11 may cause the pressure in containment vessel 4 to decrease, as the vapor 11 is transformed back into liquid coolant. A sufficient amount of heat may be removed through the condensation of vapor 11 on the inner surface of containment vessel 4 to control the removal of decay heat from reactor core 6.

The condensed coolant 10 may descend to the bottom of containment vessel 4 and collects as a pool of liquid. As more vapor 11 condenses on the inner surface of containment vessel 4, the level of coolant 10 within containment vessel 4 may gradually rise. Heat stored in the vapor 11 and/or coolant 10 may be transferred through the walls of the containment vessel 4 to the surrounding environment. By substantially removing gases from the containment region, the initial rate of condensation of vapor 11 on the inner surface of containment vessel 4 may be increased by virtue of the evacuated gases. Gases that would normally accumulate at the inner surface of containment vessel 4 to inhibit the condensation of coolant 10 are either at such low levels or are swept from the inner surface due to the natural convection of the coolant 10, that the rate of condensation may be maximized. Increasing the rate of condensation may in turn increase the rate of heat transfer through containment vessel 4.

A vacuum within the containment region 14 may act as a type of thermal insulation during normal operation of the reactor module, thereby retaining heat and energy in reactor vessel 2 where it can continue to be utilized for power generation. As a result, less material insulation may be used in the design of reactor vessel 2. In some examples, a reflective insulation may be used instead of, or in addition to, conventional thermal insulations. Reflective insulation may be included on one or both of reactor vessel 2 or containment vessel 4. The reflective insulation may be more resistant to water damage compared to conventional thermal insulation. In addition, reflective insulation may not impede a transfer of heat from reactor vessel 2 as much as the conventional thermal insulation during an emergency condition. For example, an exterior stainless steel surface of reactor vessel 2 may come into direct contact with any coolant located in containment region 14.

Figure 2:
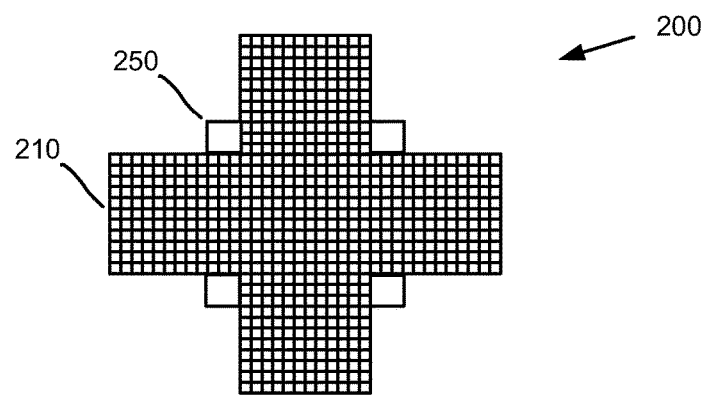
FIG. 2 illustrates an example reactor core configuration, including a neutron source.

A neutron detection device 25 is shown mounted to an exterior of containment vessel 4. Neutron detection device 25 may be positioned at an approximate core elevation. Neutron detection device 25 may be configured to detect neutrons generated at or near reactor core 6. The detected neutrons may comprise fast neutrons, slow neutrons, thermalized neutrons, or any combination thereof. In some examples, neutron detection device 25 may be separated from a neutron source by containment region 14. Neutrons generated by and/or emitted from the neutron source and/or from the reactor core 6 may pass through containment region 14 prior to being detected by neutron detection device 25. FIG. 2 illustrates an example reactor core configuration 200, including a neutron source 250. Neutron source 250 may comprise a device configured to provide a stable and reliable source of neutrons for the initiation of a nuclear chain reaction, for example when the reactor includes new fuel rods whose neutron flux from spontaneous fission may otherwise be insufficient for purposes of reactor startup. Neutron source 250 may be configured to provide a constant number of neutrons to the nuclear fuel during startup or when restarting the reactor after being shutdown (e.g., for maintenance and/or inspection).

Neutron source 250 may be positioned so that the neutron flux it produces is detectable by reactor monitoring instrumentation. For example, neutron source 250 may be inserted in regularly spaced positions inside the reactor core, such as in place of one or more fuel rods 210. When the reactor is shutdown, neutron source 250 may be configured to induce signals that may be detected by the reactor monitoring instrumentation. In some examples, the equilibrium level of neutron flux in a subcritical reactor may be dependent on the strength of neutron source 250. Neutron source 250 may be configured to provide a minimum level of neutron emissions to ensure that the reactor level may be monitored, such as during reactor startup.

Control rods and/or fuel rods 210 may be configured to initiate a reactor startup based, at least in part, on the inferred power level of the reactor. One or more of the control rods may be removed from fuel rods 210 during a reactor startup, causing the reactor core to become critical. In some examples, the power level of the reactor may be inferred, at least in part, from the number of neutrons that are emitted from neutron source 250 and/or additional neutrons that are generated as a result of a subcritical multiplication process in the reactor core 6 (FIG. 1) that may occur in response to the emission of neutrons by neutron source 250.

Figure 3:
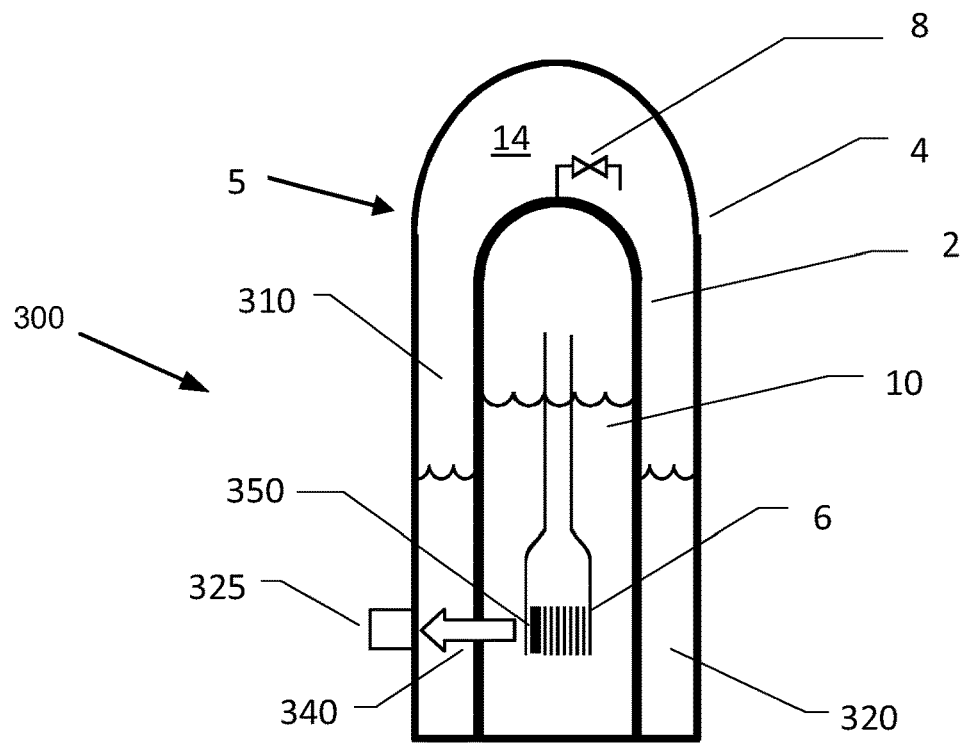
FIG. 3 illustrates an example neutron detection system.

FIG. 3 illustrates an example neutron detection system 300 including a neutron detector 325. In some examples, neutron detector 325 may be configured to operate similarly as neutron detection device 25 (FIG. 1). Neutron detector 325 may be configured to detect neutrons being emitted from a neutron source 350 and/or from reactor core 6. Additionally, neutron detector 325 may be configured to calculate, measure, estimate, infer, and/or otherwise determine a reactor power level based, at least in part, on the number of detected neutrons. In some examples, neutron detector 325 may be located on the outside of containment vessel 4 and neutron source 350 may be located at, near, or within reactor core 6.

As described with respect to FIG. 1, reactor core 6 may be located within a reactor vessel, such as reactor vessel 2. Additionally, reactor vessel 2 may be located within a containment vessel, such as containment vessel 4. The space located between reactor vessel 2 and containment vessel 4, e.g., containment region 14, may be filled, or at least partially filled, with a medium and/or mediums. The medium may comprise or consist of air or a gas, such as nitrogen. In some examples, the medium may comprise and/or be maintained at a partial vacuum or a complete vacuum. In still other examples, the medium may comprise a fluid, such as water, which may be borated.

The distance between neutron source 350 and neutron device 325, in addition to the particular medium and/or mediums through which the neutrons must travel, may result in an attenuation path 340 of the neutrons. Depending on the length of attenuation path 340 and/or the moderating effects of one or mediums through which the neutrons pass through, some or all of the neutrons may be attenuated, absorbed, thermalized, and/or scattered. Accordingly, a neutron device may be unable to detect any neutrons, or may be unable to detect a sufficient number of neutrons, to confirm that neutron source 350 is present and/or generating the expected number of neutrons for a particular mode of operation of reactor module 5, such as during reactor startup, reactor shutdown, inspection, maintenance, and/or refueling.

A weak signal received by a neutron detector may result in some ambiguity as to whether neutron source 350 is operating correctly and/or needs to be replaced, and may affect the decision to start up reactor module 5. On the other hand, during reactor shutdown when the reactivity may be expected to be relatively low, a weak signal may mask an unexpected increase in reactivity. In the event of an increased level of reactivity, measures may be taken to control the reactivity such as the injection of boron into coolant 10.

In some examples, containment region 14 may comprise a partial vacuum during normal operation of the reactor module, including reactor startup. The partial vacuum may be configured to provide thermal insulation for reactor vessel 2 and may substantially reduce the amount of, or substantially eliminate, thermal heat transfer (convective and/or conductive) between reactor vessel 2 and containment vessel 4.

With respect to the flow of neutrons from neutron source 350 and/or from reactor core 6 to neutron detector 325, a first medium comprising a partial or complete vacuum may have a substantially smaller attenuating effect on the neutrons than a second medium such as water, air, other types of liquids and/or gases, or any combination thereof. Accordingly, for the same attenuation distance, a substantially larger number of neutrons may be detected by neutron detector 325 which may be at least partially separated from neutron source 350 and/or from reactor core 6 by a partial vacuum, as compared to if neutron detector 325 is separated from neutron source 350 and/or from reactor core 6 (e.g., having the same neutron output) by a medium comprising a gas and/or a liquid.

Containment region 14 may comprise a first medium 310. For example, containment region 14 may comprise first medium 310 during a reactor startup. First medium 310 may completely fill containment region 14 in certain operating conditions and/or example systems. In other operating conditions and/or example systems first medium 310 may only partially fill containment region 14. In some examples, first medium 310 may comprise a partial vacuum or a complete vacuum.

Reactor vessel 2 may be configured to release vapor, water, air, gas, liquid, and/or steam into containment region 14. For example, flow limiter 8 may be configured to release coolant 10 into containment region 14 during an over-pressurization incident and/or a high core temperature condition, within reactor vessel 2. The release of a medium, such as coolant 10, into containment region 14 may cause the operating pressure within containment vessel 4 to increase from a partial vacuum to an atmospheric pressure and eventually to an above-atmospheric pressure.

Second medium 320 may comprise coolant 10. In some examples, coolant 10 may be released as steam into containment region 14 and may condense as liquid on an inner surface of containment vessel 2. Additionally, containment region 14 may be configured to fill with a second medium 320, and the level of second medium 320 within containment vessel 4 may rise as the corresponding level of coolant 10 decreases within reactor vessel 2. One or more mediums which may be released from reactor vessel 2 may affect the attenuation path 340 of neutrons from neutron source 350 and/or from reactor core 6 to neutron detector 325. For example, second medium 320 may diminish or reduce the number of neutrons detected and/or received by neutron detector 325. In some examples, containment vessel 4 may fill with a medium, such as second medium 320, during a refueling process.

The cost and/or complexity of a neutron source, such as neutron source 350, may be related to the strength of the neutron source. For example, a neutron source that generates a relatively high number of neutrons may cost more than a neutron source that generates relatively fewer neutrons. The selection of a neutron source for a reactor may take into account the expected attenuation path during one or more modes of operation. For example, if a particular mode of operation includes the presence of water or other types of liquid as an attenuating medium, the neutron source may be sized and/or selected such that the number of neutrons which are transmitted through the liquid and received by the neutron detector is greater than a minimum threshold requirement associated with the particular mode of operation. On the other hand, some types of neutron sources may generate more neutrons than are required during another mode of operation which may be associated with a different intervening medium, such as air, other types of gas, and/or a partial vacuum.

The mode of operation associated with the presence of a particular medium, such as second medium 320, may not be a typical mode of operation. For example, for much of the operational life of reactor module 5, containment region 14 may be filled with a gas, such as air. The selection of the neutron source for a mode of operation which may occur only a fraction of time, if at all, of the overall operating life of reactor module 5, may result in a neutron source which, generally speaking, may produce more neutrons than are needed, and thus may cost more than a neutron source which would otherwise be suitable under most operating conditions.

Some types of neutron sources may originally be inert or may be considered as a low-level neutron source, and may be configured to begin producing neutrons after an initial reactor startup. In some examples, neutron source 350 may comprise a relatively inert or low-level neutron producing neutron source which may be installed in a reactor module comprising a gas and/or partial vacuum separating neutron source 350 from neutron detector 325. At reactor startup, for example, neutron source 350 may nevertheless produce a sufficient number of neutrons that exceed a predetermined minimum threshold at neutron detector 325 due, at least in part, to the relatively low attenuation of the gas and/or partial vacuum medium associated with attenuation path 340.

During operation of the reactor, neutron source 350 may be configured to absorb neutrons being generated by the critical reactor core 6 and transform into a relatively high-level neutron source over time. A transformed or high-level neutron source may in turn generate more neutrons as compared to the low-level neutron source that was first used for reactor startup.

In some examples, neutron source 350 may be configured to generate a first number of neutrons, sufficient for purposes of a first mode of operation such as reactor startup, and over time may generate a second number of neutrons, greater than the first number of neutrons, which are sufficient for a second mode of operation. In some examples, the second mode of operation may comprise full power operation of the nuclear reactor. Additionally, the second mode of operation may comprise a subsequent reactor startup, e.g., after the reactor has been shutdown. For example, the strength of neutron source 350 at the subsequent reactor startup may be greater than the strength of neutron source 350 at the first and/or initial reactor startup, such as when neutron source 350 was first utilized and/or installed into reactor core 6.

The first number of neutrons may be sufficient to produce a sufficiently strong signal at neutron detector 325 when separated by first medium 310, such as a gas and/or partial vacuum. The second number of neutrons may be sufficient to produce a sufficiently strong signal at neutron detector 325 when separated from neutron source 350 by second medium 320, such as a liquid. Second medium 320 may be a stronger attenuator, e.g., able to absorb, thermalize, and/or scatter more neutrons, as compared to first medium 310.

In some examples, the attenuation path 340 associated with a first mode of operation may comprise the passage of neutrons through coolant 10 and first medium 310. The second mode of operation may comprise the passage of neutrons through coolant 10 and second medium 320. Additionally, attenuation path 340 may comprise the passage of neutrons through one or both of the respective walls of reactor vessel 2 and containment vessel 4.

Neutron detector 325 may be used to provide information about the power level associated with reactor core 6. This information may be inferred by monitoring the number of neutrons reaching neutron detector 325. Neutron detector 325 may be configured to determine the power level in reactor core 6 when it is shutdown. The number of neutrons that are available to reach neutron detector 325 may be many orders of magnitude greater in an operating reactor as compared to when the reactor is in a shutdown mode of operation.

When the reactor is shutdown, there is a subcritical multiplication of neutrons in the reactor core 6. In addition to one or more neutron sources designed to generate neutrons, reactor core 6 may comprise other sources of neutrons. For example, when a neutron is created or "born", it adds to the population of neutrons. Every time a neutron is absorbed or leaked from reactor core 6, the neutron may be subtracted from the population neutrons in reactor core 6. While a neutron life is relatively short, it is not instantaneous, and as a result there may be a lot more neutrons present in reactor core 6 at any given time than are being born.

As a reactor gets closer to being critical (i.e., the point at which the number of neutrons being added and the number of neutrons be subtracted at any given time is equal) the effective life expectancy of the neutron lengthens. The effective life expectancy of the neutron may take into account the interaction of the neutron with the fuel in reactor core 6 that in turn creates additional neutrons. The closer the reactor is to being critical the more likely that the neutron will react with the fuel. As the effective life expectancy of the neutrons lengthens, the number of active neutrons in reactor core 6 (e.g., as measured by neutron flux) may increase while the number of neutrons being born (e.g., the source neutrons) may remain unchanged. The change in the number of neutrons in the core is inversely proportional to how close the reactor is to reaching criticality. In some examples, the multiplication factor may be very large. Based, at least in part, on the neutron flux and/or population of neutrons, the system may estimate how close the reactor is to reaching criticality.

Additionally, based on the number of active neutrons alive at any given time (e.g., the neutron flux), the system may be used to control when or if the reactor is allowed to become critical. In some examples, one or more neutron sources may be included in reactor core 6 to raise the level of neutrons being born so that the neutron flux created by subcritical multiplication process may be large enough to be monitored by neutron detector 325 and, ultimately, to allow for control of the reactor criticality.

Figure 4:
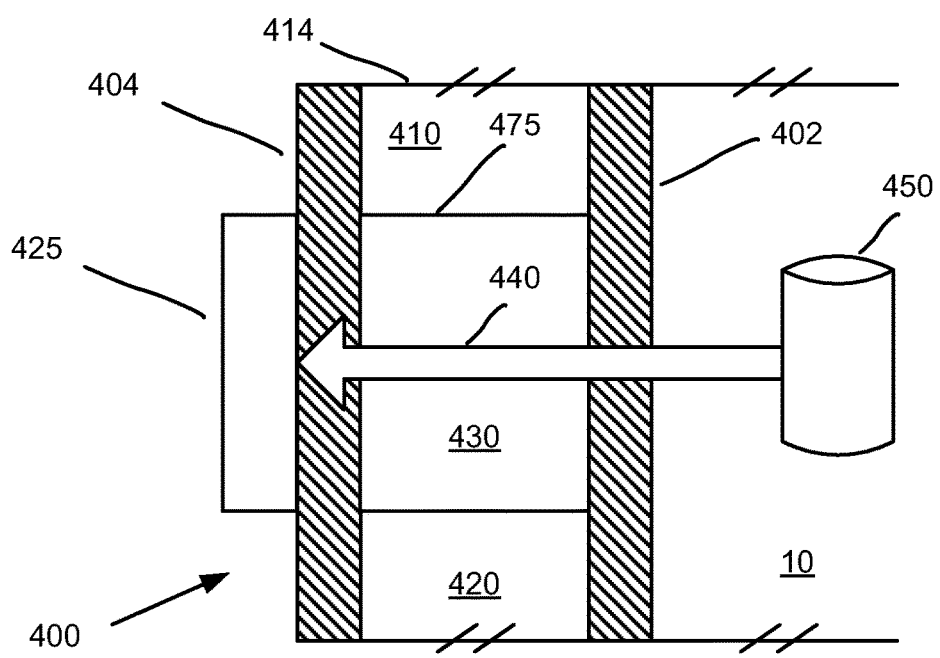
FIG. 4 illustrates another example neutron detection system.

In some examples, few of the neutrons generated from the neutron source may be directly measured by neutron detector 325. Rather, the neutrons generated by the neutron source may contribute to the number of subcritical fissions and/or to the neutron flux that occurs in reactor core 6, thereby contributing to subsequent neutrons which are generated in reactor core 6. These subsequently generated neutron may ultimately be measured by neutron detector 325. In some examples, the neutrons generated by the neutron source may be indirectly measured by neutron detector 325 based on the number of subsequently generated neutrons which result from the subcritical fissions in reactor core 6. FIG. 4 illustrates an example neutron detection system 400 and an example neutron path device 475. Neutron path device 475 may be configured to enhance, augment, multiply, and/or otherwise increase the number of neutrons that may be detected at a neutron detector 425 by providing a neutron attenuation path 440 comprising an attenuation path medium 430 which may be a weaker attenuator as compared to a second medium 420. Second medium 420 may be present in a containment region 414 located external to a reactor vessel wall 402. A neutron attenuation coefficient associated with attenuation path medium 430 may be smaller than the neutron attenuation coefficient associated with second medium 420. The relative size and/or value of the neutron attenuation coefficient may be used to determine the overall propensity of the particular medium to scatter and/or absorb neutrons.

In some examples, one or both of a first medium 410 and a second medium 420 may substantially surround neutron path device 475. Attenuation path medium 430 may be a weaker attenuator as compared to first medium 410 and/or second medium 420. For example, a neutron attenuation coefficient associated with attenuation path medium 430 may be smaller than the neutron attenuation coefficient associated with one or both of first medium 410 and second medium 420.

Attenuation path medium 430 may comprise a gas and/or partial vacuum. In some examples, neutron path device 475 may be completely evacuated, or may comprise a substantially complete vacuum. In other examples, attenuation path medium 430 may comprise stainless steel, carbon steel, Zirconium, Zircaloy, other types of solid materials, or any combination thereof. Neutron path device 475 may comprise a box, tube, pipe, and/or other type of container that may be located between a neutron source 450 and neutron detector 425. For example, neutron path device 475 may be constructed of and/or comprise stainless steel, carbon steel, Zirconium, Zircaloy, other types of materials or composites, or any combination thereof.

Neutron path device 475 may be mounted, attached, or located adjacent to an outer wall of a reactor vessel and/or to an inner wall of a containment vessel. For example, neutron path device 475 is illustrated as being located between and/or intermediate to reactor vessel wall 402 and a containment vessel wall 404. In some examples, neutron path device 475 may be welded to containment vessel wall 404 and a gap or space may be maintained between neutron path device 475 and reactor vessel wall 402. The gap may be configured to allow for thermal expansion of neutron path device 475, reactor vessel wall 402, and/or containment vessel wall 404 during operation of the reactor.

Neutron path device 475 may be located substantially within containment region 414. In some examples, neutron path device 475 may be located entirely within containment region 414, intermediate reactor vessel wall 402 and containment vessel wall 404. Neutron attenuation path 440 may comprise the passage of neutrons from neutron source 450 and through one or both of reactor vessel wall 402 and containment vessel wall 404 prior to being detected by neutron detector 425. Additionally, neutron attenuation path 440 may comprise the passage of neutrons through coolant 10 located within reactor vessel wall 402.

In some examples, neutron path device 475 may be configured to penetrate one or both of reactor vessel wall 402 and containment vessel wall 404 to provide a more direct path between neutron source 450 and neutron detector 425. By penetrating into and/or through one or both vessel walls 402, 404, the attenuating effects of the vessel walls 402, 404 may be reduced and/or eliminated, thus allowing for more of the neutrons being emitted from neutron source 450 to arrive at and/or be detected by neutron detector 425.

In other examples, neutron path device 475 does not penetrate through and/or into one or both of reactor vessel wall 402 and containment vessel wall 404 to reduce the number of vessel penetrations and in order to avoid potential leak points and/or introduce additional design parameters that could affect the structural integrity of the vessels.

During a first mode of operation, containment region 414 may substantially comprise a uniform medium. For example, during normal operation of a reactor module, the medium may comprise air or other types of gas maintained at a partial vacuum. In some examples, the medium initially contained within containment region 414 may have substantially similar neutron attenuation characteristics as attenuation path medium 430 contained in neutron path device 475. For example, attenuation path medium 430 may comprise first medium 410 and/or first medium 410 may comprise attenuation path medium 430. Neutrons which are emitted from neutron source 450 may therefore be propagated through neutron path device 475 in a similar manner as other neutrons which are propagated through the uniform medium which is initially contained within containment region 414.

During a second mode of operation, containment region 414 may comprise second medium 420 in addition to, or in place of, first medium 410. For example, during an emergency mode of operation, such as an over-pressurization or high temperature incident, the reactor vessel may be configured to release vapor, steam, and/or water into containment region 414. In some examples, second medium 420 may comprise and/or may include substantially similar neutron attenuation characteristics as coolant 10 contained in the reactor vessel.

The pressure in containment region 414 may increase due to released steam, gas, liquid, vapor, and/or coolant, resulting in a greater than atmospheric pressure condition with containment region 414. In some examples, a condensation of steam and/or liquid released by the reactor vessel may cause a fluid level within containment region 414 to rise. Second medium 420 may substantially surround neutron path device 475, or at least about the sides of neutron path device 475, during the second mode of operation.

Neutron path device 475 may be sealed. For example, neutron path device 475 may be sealed in order to maintain at least a portion of neutron attenuation path 440 at a partial and/or complete vacuum. Under one or both of the first and second operating conditions, neutron path device 475 may remain sealed such that first medium 410 and/or second medium 420 are not allowed to enter neutron path device 475. Similarly, neutron path device 475 may be configured to prohibit the release of attenuation path medium 430 from neutron path device 475 and/or to maintain a partial and/or a complete vacuum within neutron path device 475 during one or both of the first and second operating conditions.

By maintaining neutron attenuation path 440 with substantially consistent neutron attenuation characteristics under multiple modes of reactor operation, neutron source 450 and/or neutron path device 475 may be configured to provide a substantially continuous, reliable, and/or uniform level of neutron flux to neutron detector 425 regardless of the operating condition and/or regardless of the surrounding medium within containment region 414. Accordingly, neutron source 450 may be selected and/or sized to provide a sufficient number of neutrons that may be detected by neutron detector 425 through neutron attenuation path 440.

By utilizing a medium and/or evacuated state for neutron attenuation path 440 which minimizes the amount of neutron attenuation, a smaller and/or less expensive neutron source may be selected. For example, a relatively low power neutron source may continue to generate a sufficient number of neutrons that may be detected by neutron detector 425 under any operating condition of the reactor. Additionally, by selecting and/or sizing neutron source 450 as a relatively low-powered neutron source, neutron cross-talk between adjacent reactor modules and their respective nuclear detectors, such as in a modular reactor design comprising a plurality of reactor modules, may be minimized and/or eliminated, which may result in more accurate neutron flux measurements at each neutron detector.

Figure 5:
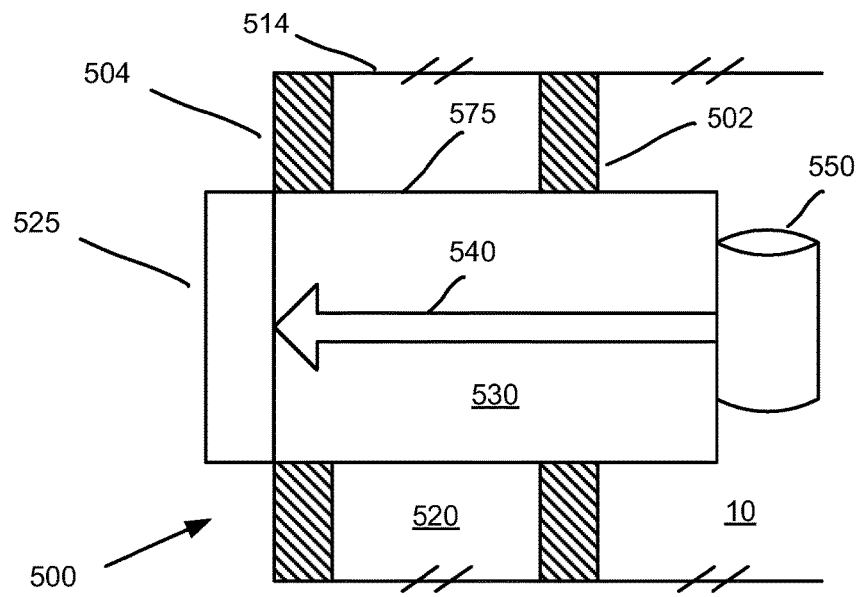
FIG. 5 illustrates yet another example neutron detection system.

FIG. 5 illustrates an example neutron detection system 500 and an example neutron path device 575. Neutron path device 575 may be configured to enhance, augment, multiply, and/or otherwise increase the number of neutrons detected at a neutron detector 525 by providing a neutron attenuation path 540 comprising an attenuation path medium 530 which may be a weaker attenuator as compared to a medium 520 associated with a containment region 514. In some examples, medium 520 may substantially surround neutron path device 575. Attenuation path medium 530 may be a weaker attenuator as compared to medium 520.

Attenuation path medium 530 may comprise a gas, a liquid, and/or a solid material, similar to that discussed for attenuation path medium 430 (FIG. 4). In some examples, neutron path device 575 may be partially or completely evacuated, and may comprise one or more materials as discussed for neutron path device 475.

Neutron path device 575 is illustrated as penetrating one or both of a reactor vessel wall 502 and a containment vessel wall 504 to provide a more direct path between neutron source 550 and neutron detector 525. By penetrating into and/or through one or both vessel walls 502, 504, the attenuating effects of reactor vessel wall 502 and/or containment vessel wall 504 may be reduced and/or eliminated, thus allowing for more of the neutrons being emitted from neutron source 550 to arrive at and/or be detected by neutron detector 525.

Containment region 514 may comprise a medium 520 during one or more modes of operation. In some examples, medium 520 may substantially surround neutron path device 575, or at least about the sides of neutron path device 575. Neutron path device 575 may be configured such that medium 520 is not allowed to enter neutron path device 575 and attenuation path medium 530 is not allowed to exit from neutron path device 575. Accordingly, neutron source 550 may be selected and/or sized to provide a sufficient number of neutrons that may be detected by neutron detector 525 through neutron attenuation path 540. On the other hand, neutron source 550 may be selected and/or sized such that neutrons would not be detected through medium 520.

In some examples, neutron path device 575 may project through reactor vessel wall 502 and into coolant 10 contained within the reactor. Attenuation path medium 530 may be a weaker attenuator as compared to coolant 10. Neutron attenuation path 540 may extend, partially or completely, between neutron source 550 and neutron detector 525. Similarly, neutron attenuation path 540 may be partially or completely contained within neutron path device 575.

In some examples, the attenuation of neutrons generated and/or emitted by neutron source 550 and received by neutron detector 525 via neutron attenuation path 540 may be attenuated entirely, or substantially entirely, by neutron path device 575 and/or by attenuation path medium 530. Additionally, neutron path device 575, neutron detector 525, and/or neutron source 550 may be manufactured and/or assembled together as a unitary, or physically integrated, neutron detection device.

The distance between reactor vessel wall 502 and containment vessel wall 504 may be several meters. Similarly, the length of neutron path device 575 may be several meters. In some examples, neutron path device 575 and/or neutron attenuation path 540 may be between one and four meters in length. A width and/or diameter of neutron path device 575 may be several centimeters, for example between approximately five and twenty five centimeters. Shorter or longer lengths and/or widths are contemplated herein.

The overall volume of neutron path device 575 may be varied and/or have an effect on the displacement of medium 520 within containment region 514 and/or may reduce or enhance the cooling rate of the reactor cooling system and/or the emergency core cooling system.

The neutron path device 575 may be configured to displace a volume of space associated with the reactor cooling system and/or the emergency core cooling system. The neutron path device 575 and associated displaced volume of space may reduce the amount of water and/or coolant inventory that may otherwise be required to achieve proper functionality of the cooling system. In some examples, the reduced amount of coolant inventory similarly may reduce the amount of water and/or coolant required to maintain the water/coolant level above the reactor core. The reduced amount of coolant inventory may reduce the amount of water and/or coolant required to produce a natural circulation cooling loop within the reactor vessel. Additionally, the displaced volume of space may increase a hydrostatic head associated with the cooling system.

In some examples, the neutron path device 575 may be configured to increase a cool-down rate associated with the cooling system, based, at least in part, on a composition of the neutron path device 575. For example, the composition of neutron path device 575 may include the introduction of new materials and/or geometries into the location(s) where heat transfer occurs. The composition of neutron path device 575 may increase the overall thermal conduction and/or surface area to adjust (e.g., increase or decrease) the cool down rate during or after operation of the cooling system.

Figure 6:
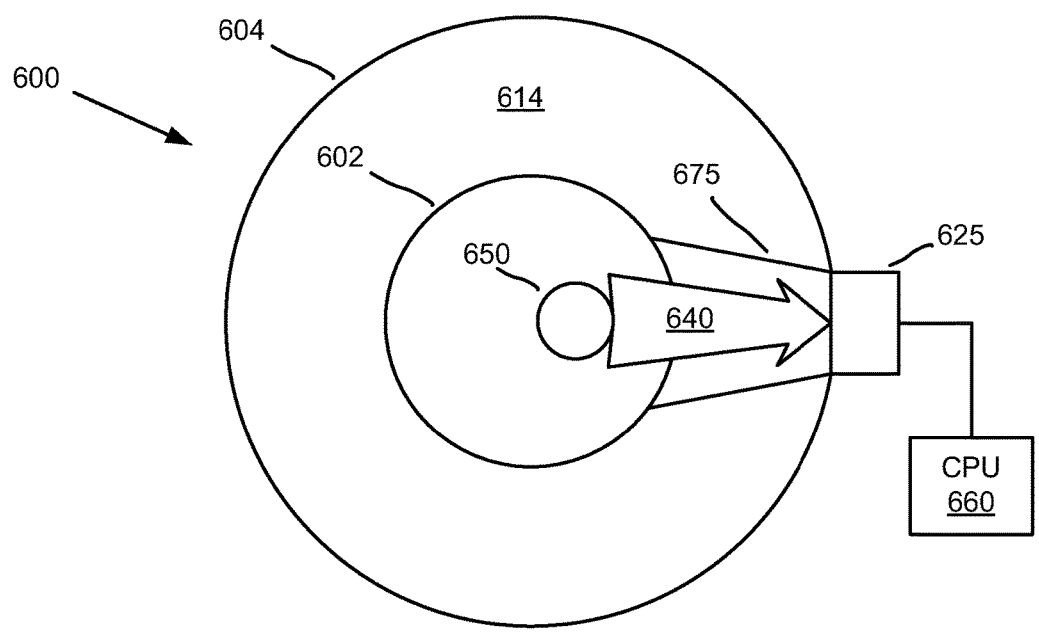
FIG. 6 illustrates a top view of an example neutron detection system.

FIG. 6 illustrates a top view of an example neutron detection system 600 and an example neutron path device 675. Neutron path device 675 may be configured to provide a neutron attenuation path 640 between a neutron source 650 and a neutron detector 625. In some examples, neutron path device 675 may be configured to provide an enlarged neutron path through a containment region 614 located intermediate a reactor vessel 602 and a containment vessel 604.

Neutron attenuation path 640 may comprise an enlarged first end proximate to and/or facing neutron source 650 and a narrowed second end proximate to and/or facing neutron detector 625. For example, a width of the second end of neutron attenuation path 640 and/or of neutron path device 675 may be approximately equal to a width of neutron detector 625. In some examples, at least a portion of neutron path device 675 and/or neutron attenuation path 640 may be tapered, trapezoidal in shape, funnel shaped, pyramid shaped, conical shaped, or some combination thereof. An enlarged neutron path may be configured to more efficiently capture, detect, and/or transmit a larger number of neutrons being generated and/or emitted from neutron source 650.

One or more of the neutron detectors described herein may comprise a sensor, a dosimeter, a gauge, an indicator, a receiver, a transmitter, other types of detection device, or any combination thereof. Additionally, one or more of the neutron detectors may comprise, be connected to, and/or be configured to communicate with, one or more processing devices, such as processing device 660, and/or other types of reactor instrumentation.

In some examples, multiple neutron path devices, such as neutron path device 675, and corresponding neutron detectors, such as neutron detector 625, may be positioned and/or located in a neutron detection system, such as neutron detection system 600. For example, two, three, or four neutron path devices and/or neutron detectors may be located at approximately 180 degree intervals, 120 degree intervals, or 90 degree intervals, respectively, about reactor vessel 602.

Neutron path device 675 may comprise and/or be integrated with a containment support structure, strut, and/or alignment device for assembling reactor vessel 602 and/or containment vessel 604. For example, neutron path device 675 may be configured to both provide neutron attenuation path 640 and to structurally connect and/or support reactor vessel 602 within containment vessel 604. Two or more similarly shaped structures as neutron path device 675 may be used to support reactor vessel 602, although in some examples only one of the structures may be used to provide neutron attenuation path 640.

Figure 7:
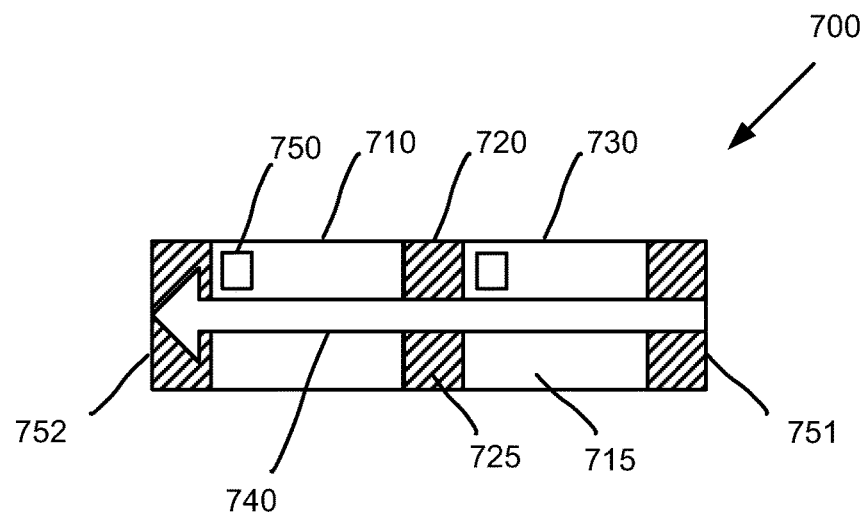
FIG. 7 illustrates an example neutron path device.

FIG. 7 illustrates an example neutron path device 700. In some examples, neutron path device 700 may be located, mounted, attached, and/or utilized similarly to one or more of the previously described neutron path devices. Neutron path device 700 may comprise a series of segmented compartments, such as first compartment 710, second compartment 720, and third compartment 730. In some examples, one or both of first compartment 710 and third compartment 730 may comprise or be configured to contain a first medium 715. Second compartment 720 may comprise or be configured to contain a second medium 725. Second compartment 720 may adjoin and/or be located intermediate to first compartment 710 and third compartment 730.

In some examples, first medium 715 may comprise a gas. Additionally, first medium 715 and/or first compartment 710 may be maintained at a partial vacuum or a complete vacuum. Second medium 725 may comprise a solid material. In some examples, first medium 715 and/or second medium 725 may comprise a liquid. An attenuation coefficient associated with first medium 715 may be less than an attenuation coefficient associated with second medium 725. Neutron path device 700 may be configured to provide a neutron path 740 through all of the compartments 710, 720, 730. Similarly, neutron path 740 may comprise, or pass through, both first medium 715 and second medium 725.

Neutron path device 700 may comprise a first end 751 which is configured to face and/or to receive neutrons from a neutron source. Additionally, neutron path device 700 may comprise a second end 752 which is configured to face and/or to transmit neutrons to a neutron detector.

First compartment 710 may be sealed in order to prohibit the release of first medium 715 out of first compartment 710. Similarly, third compartment 730 may be sealed in order to prohibit the release of first medium 715 out of third compartment 730. In some examples, one or both of first compartment 710 and third compartment 730 may be separately sealed to maintain a partial vacuum and/or a complete vacuum independently of each other.

In the event of the failure of one or more of the compartments, e.g., in the event that first compartment 710 becomes breached or compromised, some or all of first medium 715 may escape from neutron path device 700. Similarly, one or more surrounding mediums may be allowed to enter first compartment 710. By including additional sealed compartments, such as third compartment 730, at least a portion of neutron path 740 may continue to pass through first medium 715 in the event that one or more of the compartments fail. One or more sensors 750 and/or alarms may be configured to monitor for the failure and/or breach of one or more of the compartments.

A neutron source may be sized and or selected such that is configured to provide a sufficient number of neutrons to be detected and/or received by a neutron detector, for example in the event that one or more of the compartments of neutron path device 700 fails or is breached. Assuming there are "n" compartments associated with a particular medium and "m" compartments may potentially be compromised, the neutron source may be selected such that a sufficient number of neutrons may be detected and/or received for n-1, n-2, n-3 . . . or n-m compartments associated with a particular medium and/or mediums, depending on the level of redundancy and/or probability of failure that the system is designed for.

Second compartment 720 may comprise a retaining wall between first compartment 710 and third compartment 730. For example, first compartment 710 and third compartment 730 may be adjoining or adjacent compartments separated by a retaining wall. The retaining wall may be configured to provide a bulwark in the event that one of the compartments fails or is breached. In some examples, neutron path device 700 may comprise a series of segmented compartments separated by intermediate retaining walls. Each of the segmented compartments may be separately sealed by one or more of the intermediate retaining walls. In some examples, neutron path device 700 and/or the one or more intermediate retaining walls may comprise and/or be made of stainless steel, carbon steel, Zirconium, Zircaloy, other types of materials or composites, or any combination thereof.

Figure 8:
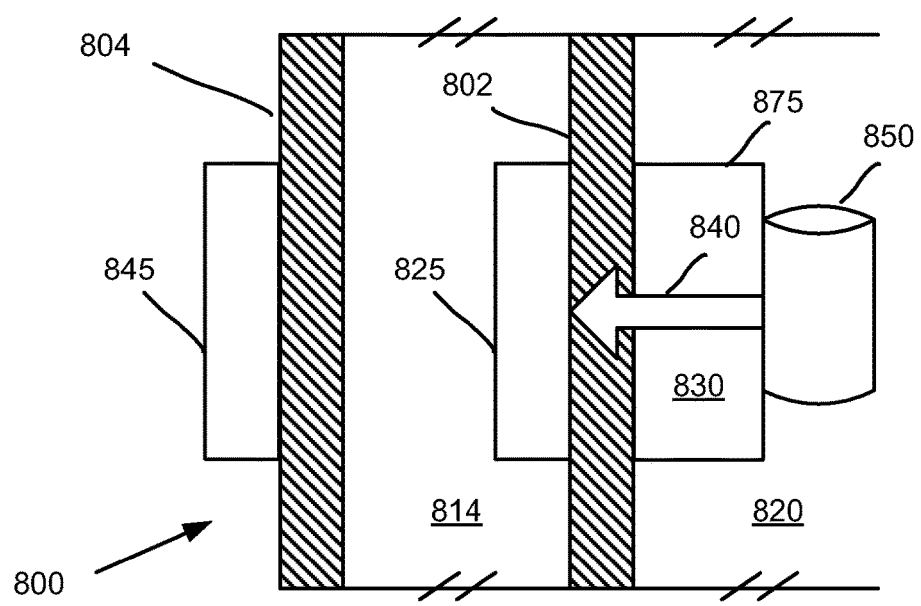
FIG. 8 illustrates a further example neutron detection system.

FIG. 8 illustrates an example neutron detection system 800 and an example neutron path device 875. Neutron path device 875 may be configured to enhance, augment, multiply, and/or otherwise increase the number of neutrons detected at a neutron detector 825 by providing a neutron attenuation path 840 comprising an attenuation path medium 830 which may be a weaker attenuator as compared to a medium 820 contained in a reactor vessel and/or in a containment vessel. Neutron detector 825 may be located with a containment region 814 formed intermediate a reactor vessel wall 802 and a containment vessel wall 804. In some examples, medium 820 may substantially surround neutron path device 875. Attenuation path medium 830 may be a weaker attenuator as compared to medium 820.

Attenuation path medium 830 may comprise a gas, a liquid, and/or a solid material, similar to that discussed for attenuation path medium 430 (FIG. 4). In some examples, neutron path device 875 may be partially or completely evacuated, and may comprise one or more materials as discussed for neutron path device 475.

Neutron path device 875 may be mounted to reactor vessel wall 802. In some examples, neutron path device 875 may be configured to penetrate into or through reactor vessel wall 802 to provide a more direct path between neutron source 850 and neutron detector 825. By penetrating into and/or through reactor vessel wall 802, the attenuating effects of reactor vessel wall 802 may be reduced and/or eliminated, thus allowing for more of the neutrons being emitted from neutron source 850 to arrive at neutron detector 825.

In some examples, medium 820 may substantially surround neutron path device 875, or at least about the sides of neutron path device 875. Neutron path device 875 may be configured such that medium 820 is not allowed to enter neutron path device 875 and attenuation path medium 830 is not allowed to exit from neutron path device 875. Accordingly, neutron source 850 may be selected and/or sized to provide a sufficient number of neutrons that may be detected by neutron detector 825 through neutron attenuation path 840.

Neutron attenuation path 840 may extend between neutron source 850 and neutron detector 825. For example, neutron attenuation path 840 may be partially or completely contained within neutron path device 875. In some examples, the attenuation of neutrons generated and/or emitted by neutron source 850 and received by neutron detector 825 via neutron attenuation path 840 may be attenuated entirely, or substantially entirely, by neutron path device 875 and/or by attenuation path medium 830.

A second neutron detector 845 may be mounted to and/or located to an exterior surface of containment vessel wall 804. Second neutron detector 845 may be provided in addition to, or instead of, neutron detector 825. In some examples, second neutron detector 845 may be configured to provide a redundant measurement of neutrons to neutron detector 825. In some examples, neutron detector 825 may be configured to detect neutrons during a first mode of operation and second neutron detector 845 may be configured to detect neutrons during a second mode of operation. The second mode of operation may be associated with a higher flux of neutrons from neutron source 850 as compared to the first mode of operation. A neutron attenuation path associated with second neutron detector 845 may be longer than attenuation path 840.

In some examples, some or all of neutron source 450 (FIG. 4), neutron source 550 (FIG. 5), neutron source 650 (FIG. 6), neutron source 850 (FIG. 8), and/or other "neutron sources" referred to in the specification may comprise one or more dedicated neutron sources located within or proximate to a reactor core, such as illustrated in FIG. 3. In other examples, the neutron source may comprise the reactor core itself. Additionally, in certain modes of operation the reactor core may be configured to generate a sufficient number of neutrons that may be measured by the neutron detector irrespective of the presence and/or neutron output of a neutron source. The source of neutrons may transition during different modes of operations. For example, in a first mode of operation (such as reactor shut down), the primary source of neutrons may be one or more dedicated neutron sources, and in a second mode of operation (such as full power operation) the primary source of neutrons may be the reactor core. Additionally, the neutron source may comprise a combination of both one or more dedicated neutron sources and the reactor core.

Figure 9:
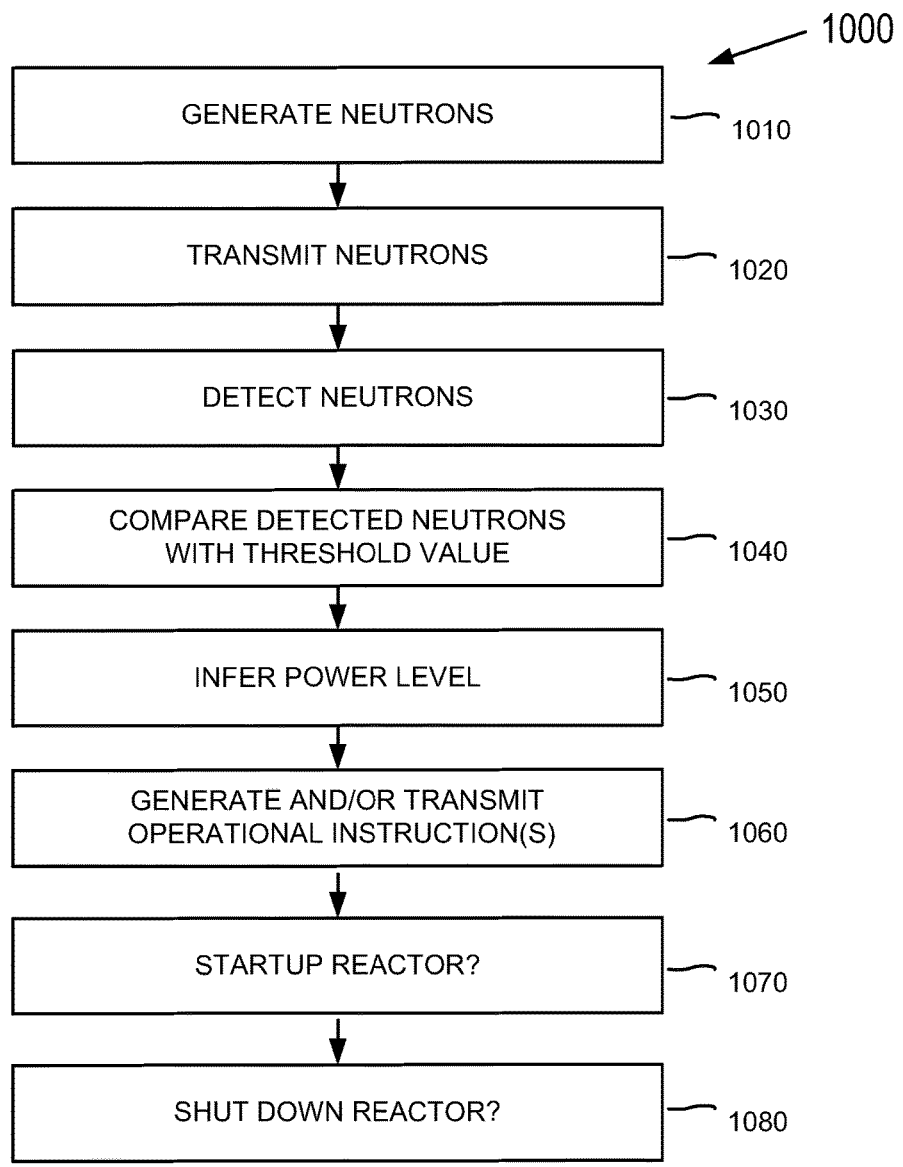
FIG. 9 illustrates an example process of detecting a neutron source.

FIG. 9 illustrates an example process 1000 of detecting a neutron source. At operation 1010, a neutron source may be configured to generate, emanate, and/or transmit neutrons. In some examples, the neutron source may be configured to generate neutrons during a reactor startup operation. The neutron source may be located within a reactor vessel At operation 1020, neutrons associated with the neutron source may travel along a neutron path located, at least partially, within a neutron path device. The neutron path device may be configured to provide the neutron path between the neutron source and a neutron detector. The neutron path device may comprise and/or contain a first medium.

In some examples, the first medium associated with the neutron path device may be configured to provide a neutron path between the reactor vessel and a surrounding containment vessel. The neutron path through the first medium may be configured to provide less attenuation of the neutrons as compared to a neutron path through the second medium.

At operation 1030, a number of the neutrons generated, emanated, and/or transmitted from the neutron source may be received, measured, detected, and/or sensed by the neutron detector.

At operation 1040, the number of detected neutrons may be compared with a threshold value. In some examples, the neutron detector may be configured to compare the number of detected neutrons with the threshold value. In other examples, the number of detected neutrons may be communicated and/or transmitted from the neutron detector to a processing device which may be configured to compare the number of detected neutrons with the threshold value. Additionally, the processing device may be configured to compare a rate of increase and/or decrease of detected neutrons, for example as compared to a previously measured and/or detected number of neutrons.

At operation 1050, the neutron detector and/or the processing device may be configured to infer a power level of the reactor based, at least in part, on the number of detected neutrons.

At operation 1060, the neutron detector and/or the processing device may be configured to generate and/or transmit an instruction based, at least in part, on the inferred power and/or based on the number of detected neutrons. For example, the instruction may be associated with the startup of the reactor, the continued operation of the reactor, the shutdown of the reactor, other reactor operations, or any combination thereof.

At operation 1070, if it is determined that the number of neutrons exceeds and/or meets the threshold value, the instruction may comprise instructions for initiating and/or proceeding with the startup of the reactor. The startup may comprise withdrawing one or more control rods from a reactor fuel assembly and/or changing the water chemistry of the primary coolant, such as by adjusting the concentration of boron, for example. In some examples, the instruction may comprise instructions for continuing operation of the reactor.

At operation 1080, if it is determined that the number of neutrons does or does not exceed and/or meet the threshold value, the instruction may comprise instructions for terminating and/or discontinuing the startup of the reactor. Operation 1080 may occur after additional generation, transmission, detection, and/or inferring operations that occur subsequent to reactor startup, such as during a full power operational mode of the reactor. In some examples, the instruction may comprise instructions for shutting down and/or discontinuing operation of the reactor.

Although the examples provided herein have primarily described a pressurized water reactor and/or a light water reactor, it should be apparent to one skilled in the art that the examples may be applied to other types of power systems as described or with some obvious modification. For example, the examples or variations thereof may also be made operable with a boiling water reactor, sodium liquid metal reactor, gas cooled reactor, pebble-bed reactor, and/or other types of reactor designs. As used herein and as described in greater detail in subsequent sections, other examples may include various nuclear reactor technologies. Thus, some examples may include nuclear reactors that employ uranium oxides, uranium hydrides, uranium nitrides, uranium carbides, mixed oxides, and/or other types of radioactive fuel.

It should be noted that examples are not limited to any particular type of reactor cooling mechanism, nor to any particular type of fuel employed to produce heat within or associated with a nuclear reaction. Any rates and values described herein are provided by way of example only. Other rates and values may be determined through experimentation such as by construction of full scale or scaled models of a nuclear reactor system.

Having described and illustrated various examples herein, it should be apparent that other examples may be modified in arrangement and detail. We claim all modifications and variations coming within the spirit and scope of the following claims.

The invention claimed is:

1. A neutron detection system comprising:
a neutron detection device located outside of a reactor vessel, wherein the neutron detection device is configured to detect neutrons generated within the reactor vessel, wherein a containment region located intermediate the reactor vessel and a containment vessel is configured to house a containment medium, and wherein a neutron attenuation coefficient is associated with the containment medium; and
a neutron path device at least partially located between an outside wall of the reactor vessel and an inside wall of the containment vessel, wherein the neutron path device is configured to provide a neutron path between the neutron source and the neutron detection device through a neutron path medium contained within the neutron path device, and wherein a neutron attenuation coefficient associated with the neutron path medium is smaller than the neutron attenuation coefficient associated with the containment medium.

2. The neutron detection system of claim 1, wherein the neutron path medium comprises a gas and wherein the containment medium comprises a liquid.

3. A neutron detection system comprising:
a neutron detection device located outside of a reactor vessel, wherein the neutron detection device is configured to detect neutrons generated within the reactor vessel, wherein a containment region located intermediate the reactor vessel and a containment vessel is configured to house a containment medium, and wherein a neutron attenuation coefficient is associated with the containment medium; and
a neutron path device at least partially located between the reactor vessel and the containment vessel, wherein
the neutron path device is configured to provide a neutron path between the neutron source and the neutron detection device through a neutron path medium contained within the neutron path device,
a neutron attenuation coefficient associated with the neutron path medium is smaller than the neutron attenuation coefficient associated with the containment medium, and
the neutron path medium is maintained at a below atmospheric pressure within the neutron path device.

4. The neutron detection system of claim 1, wherein the neutron path device extends across the entire containment region.

5. The neutron detection system of claim 4, wherein at least a portion of the neutron path device is surrounded by the containment medium, and wherein the neutron path device is configured to house the neutron path medium in isolation from the containment medium.

6. The neutron detection system of claim 1, wherein the neutron source is associated with a reactor startup operation, and wherein the neutron detection system is configured to initiate the reactor startup operation in response to the neutron path device enabling the detection of a number of the neutrons by the neutron detection device which exceeds a threshold startup value.

7. A neutron detection system comprising:
a neutron detection device located outside of a reactor vessel, wherein the neutron detection device is configured to detect neutrons generated within the reactor vessel, wherein a containment region located intermediate the reactor vessel and a containment vessel is configured to house a containment medium, and wherein a neutron attenuation coefficient is associated with the containment medium; and
a neutron path device at least partially located between the reactor vessel and the containment vessel, wherein
the neutron path device is configured to provide a neutron path between the neutron source and the neutron detection device through a neutron path medium contained within the neutron path device,
a neutron attenuation coefficient associated with the neutron path medium is smaller than the neutron attenuation coefficient associated with the containment medium, and
the neutron path device is configured to maintain the neutron path medium in an evacuated state when an exterior surface of the neutron path device is exposed to an atmospheric pressure or an above-atmospheric pressure.

8. A neutron detection system comprising:
a neutron detection device located outside of a reactor vessel, wherein the neutron detection device is configured to detect neutrons generated within the reactor vessel, wherein a containment region located intermediate the reactor vessel and a containment vessel is configured to house a containment medium, and wherein a neutron attenuation coefficient is associated with the containment medium; and
a neutron path device at least partially located between the reactor vessel and the containment vessel, wherein
the neutron path device is configured to provide a neutron path between the neutron source and the neutron detection device through a neutron path medium contained within the neutron path device,
a neutron attenuation coefficient associated with the neutron path medium is smaller than the neutron attenuation coefficient associated with the containment medium, and
the neutron path device is configured to displace a volume of space associated with a cooling system, and wherein the displaced volume of space increases a hydrostatic head associated with the cooling system.

9. The neutron detection system of claim 8, wherein the neutron path device is further configured to increase or decrease a cool-down rate associated with the cooling system, based, at least in part, on a structural composition of the neutron path device.

10. A neutron path device comprising:
a container configured to prohibit entry of a surrounding medium into the container, wherein the container is further configured to provide a neutron path between a neutron source and a neutron detector; and
a neutron path medium housed in the container, wherein the neutron path medium is maintained at a partial vacuum, and wherein a neutron attenuation coefficient associated with the neutron path medium maintained at the partial vacuum is less than a neutron attenuation coefficient associated with the surrounding medium.

11. The neutron path device of claim 10, wherein the container is further configured to prohibit entry of the surrounding medium when the surrounding medium exerts a pressure on the container which is greater than the partial vacuum.

12. The neutron path device of claim 10, wherein the neutron path medium comprises gas or air.

13. The neutron path device of claim 10, wherein the neutron path medium consists essentially of nitrogen.

14. The neutron path device of claim 10, wherein the container comprises:
   a first end configured to receive the neutrons from the neutron source; and
   a second end configured to transmit the neutrons to the neutron detector, wherein the first end is larger than the second end.

15. The neutron path device of claim 14, wherein the container comprises a tapered profile from the first end to the second end.

16. The neutron path device of claim 10, wherein the container comprises segmented compartments, wherein the neutron path passes through the segmented compartments, and wherein a plurality of the segmented compartments are separately sealed to maintain the partial vacuum.

17. An apparatus, comprising:
   means for transmitting neutrons generated within a reactor core through a neutron path, wherein the reactor core is located within a reactor vessel, wherein the neutron path includes a neutron path medium, and wherein a neutron attenuation coefficient is associated with the neutron path medium; and
   means for detecting a number of the neutrons transmitted through the neutron path, wherein the means for detecting is located outside of the reactor vessel, wherein
   a containment region located intermediate the reactor vessel and a containment vessel is configured to house a containment medium,
   at least a portion of a neutron path device is located between an outside surface of the reactor vessel and an inside surface of a containment vessel and is configured to house the neutron path medium, and
   wherein a neutron attenuation coefficient associated with the containment medium is larger than the neutron attenuation coefficient associated with the neutron path medium.

18. The apparatus of claim 17, wherein the containment medium is released into the containment region during an over-pressurization event within the reactor vessel, and wherein the means for transmitting is configured to prohibit entry of the containment medium into the means for transmitting.

19. The apparatus of claim 18, wherein the neutron attenuation coefficient associated with the neutron path medium remains relatively constant both prior to and after the containment medium is released into the containment region.

20. The apparatus of claim 17, wherein the number of detected neutrons at the means for detecting remains relatively constant both prior to and after the containment medium is released into the containment region.

* * * * *